(12) United States Patent
Tarlton

(10) Patent No.: US 7,467,799 B1
(45) Date of Patent: Dec. 23, 2008

(54) COMPOSITE METAL-TO-METAL SEAL HAVING A RELATIVELY SOFT METAL OVERLAY AND A RELATIVELY HARD METAL CORE

(75) Inventor: Oran D. Tarlton, League City, TX (US)

(73) Assignee: Oil States Industries, Inc., Arlington, TX (US)

( * ) Notice: Subject to any disclaimer, the term of this patent is extended or adjusted under 35 U.S.C. 154(b) by 1826 days.

(21) Appl. No.: 09/369,134

(22) Filed: Aug. 5, 1999

(51) Int. Cl.
F16L 21/05 (2006.01)

(52) U.S. Cl. .................. 277/603; 277/608; 277/614; 277/627; 277/650

(58) Field of Classification Search ............... 277/603, 277/608, 609, 614, 616, 627, 630, 637, 641, 277/650, 653, 654
See application file for complete search history.

(56) References Cited

U.S. PATENT DOCUMENTS

| | | | |
|---|---|---|---|
| 1,426,724 A * | 8/1922 | Fyffe | |
| 2,194,266 A | 3/1940 | Allen | 285/130 |
| 3,193,920 A * | 7/1965 | Culbertson et al. | |
| 3,507,506 A | 4/1970 | Tillman | 277/225 |
| 3,747,963 A * | 7/1973 | Shivak | |
| 3,873,105 A * | 3/1975 | Wehner | |
| 4,060,250 A | 11/1977 | Davis et al. | 277/53 |
| 4,109,923 A | 8/1978 | Tückmantel | 277/101 |
| 4,470,609 A * | 9/1984 | Poe | |
| 4,477,087 A * | 10/1984 | Sutter, Jr. et al. | |
| 4,477,105 A | 10/1984 | Wittman et al. | 285/18 |
| 4,563,025 A * | 1/1986 | Poe | |
| 4,725,080 A | 2/1988 | Josefiak et al. | 285/24 |
| 4,850,521 A * | 7/1989 | Servant | |
| 4,878,678 A * | 11/1989 | Hensley et al. | |
| 4,998,740 A * | 3/1991 | Tellier | |

(Continued)

FOREIGN PATENT DOCUMENTS

GB 952478 3/1964

(Continued)

OTHER PUBLICATIONS

"PCT International Search Report for International Application No. PCT/US 00/21421, European Patent Office, completed Nov. 9, 2000."

*Primary Examiner*—Vishal Patel
(74) *Attorney, Agent, or Firm*—Richard Auchterlonie; Novak Druce & Quigg, LLP

(57) ABSTRACT

A composite metal seal includes core of relatively hard metal, and at least one annular region of relatively soft metal. The annular region of relatively soft metal is integrally bonded with the core of relatively hard metal, and has an annular sealing surface for providing a fluid pressure seal. Such a composite metal seal can be manufactured by welding an overlay of the relatively soft metal onto a workpiece of the relatively hard metal; and machining the overlay of the relatively soft metal to form the annular sealing surface. In a preferred construction, the seal is a ring including two annular regions of the relatively soft metal, which provide tapered annular sealing surfaces for engaging respective sealing surfaces of two mating hubs. Such a seal ring can be used in a subsea collet-actuated pipeline connector to permit a metal-to-metal seal connection to be made and broken a number of times.

16 Claims, 8 Drawing Sheets

U.S. PATENT DOCUMENTS

| | | | | |
|---|---|---|---|---|
| 5,044,672 A | | 9/1991 | Skeels et al. | 285/98 |
| 5,544,902 A | * | 8/1996 | Belter | |
| 5,651,494 A | * | 7/1997 | Ogino et al. | |
| 5,669,612 A | * | 9/1997 | Nicholson | |
| 5,680,495 A | * | 10/1997 | Bloom | |
| 5,711,343 A | | 1/1998 | Beckett | 137/512.1 |
| 5,803,431 A | | 9/1998 | Hoang et al. | 251/327 |
| 5,839,765 A | * | 11/1998 | Carter et al. | |
| 5,944,319 A | * | 8/1999 | Kohlman | |

FOREIGN PATENT DOCUMENTS

| | | | |
|---|---|---|---|
| JP | 56077086 A | * | 11/1979 |
| JP | 09225652 A | * | 2/1996 |
| WO | WO 98/05463 | | 2/1998 |

* cited by examiner

COMPOSITE METAL-TO-METAL SEAL HAVING A RELATIVELY SOFT METAL OVERLAY AND A RELATIVELY HARD METAL CORE

BACKGROUND OF THE INVENTION

1. Field of the Invention

The present invention relates generally to a pressure seal for containing fluid pressure at an annular interface having a metal-to-metal contact with one or more metal annular members.

2. Description of the Related Art

Pipe connectors are typically used for joining pipe sections when the connection is not intended to be permanent and under conditions such as a subsea environment where welding is difficult or relatively unreliable. For high-pressure pipe, a common type of pipe connector forms a pressure seal by wedging a metal seal ring between two hubs. The hubs in turn are clamped together, for example by bolts and clamping rings as disclosed in Josefiak et al., U.S. Pat. No. 4,725,080, incorporated herein by reference.

For environmental protection, it is desirable for the pressure seal in the pipe connector to occur at a metal-to-metal interface. Once a proper metal-to-metal seal is made, it is considered more reliable than alternative kinds of seals such as a metal-to-elastomeric seal. Unfortunately, a proper metal-to-metal seal has been more difficult to make than a metal-to-elastomeric seal. Moreover, once a proper metal-to-metal seal has been made, it is difficult to break and later properly reset the metal-to metal seal.

There are a number of conditions that may make it difficult or impossible to obtain a proper metal-to-metal seal in a pipe connector. Typically damage or imperfections in the annular sealing surface of one of the hubs prevent a proper seal. Assuming that the hubs are properly made, the damage or imperfections may arise from rough handling or improper landing of the hubs when mating is attempted. An attempted landing when the hubs are miss-aligned may case radial scratching or marring of the sealing surfaces of seal or hubs which may prevent a proper metal-to-metal seal. For some protection from radial scratching and small defects, the mating surfaces of the seal have often been coated or plated with a very thin film of polytetrafluroethylene (Teflon), copper, nickel, silver, and gold. However, this coating or plating does not alter the mechanical characteristics of the seal. Excessive impact force during the mating of the hubs may cause large defects and inelastic deformation, know as "coining," which may cause the dimensional tolerances of the mating surfaces to deviate from acceptable limits for forming a proper metal-to-metal seal.

A conventional metal-to-metal seal also has the disadvantage that it may not be possible to reset the seal once a proper seal is broken. Inelastic deformation of the sealing surfaces beyond the dimensional tolerances for resetting the seal may occur once a proper metal-to-metal seal has been made. Such a situation may arise if the loading on the seal is excessive or if a proper seal is made when the hubs are slightly misaligned.

SUMMARY OF THE INVENTION

According to one aspect of the present invention, there is provided a composite metal seal that includes a core of relatively hard metal, and at least one annular region of relatively soft metal. The annular region of relatively soft metal is integrally bonded with the core of relatively hard metal, and has an annular sealing surface for providing a fluid pressure seal.

According to another aspect, the invention provides a composite metal seal ring for effecting a fluid pressure seal with respective annular surfaces of first and second hub members. The composite metal seal ring includes an annular core of relatively hard metal, a first annular region of relatively soft metal integrally bonded to the annular core of relatively hard metal, and a second annular region of relatively soft metal integrally bonded to the annular core of relatively hard metal. The first annular region of relatively soft metal has a first annular surface for mating with the annular surface of the first hub member to effect a fluid pressure seal with the first hub member. The second annular region of relatively soft metal has a second annular surface for mating with the annular surface of the second hub member to effect a fluid pressure seal with the second hub member. The two annular regions of relatively soft metal are displaced from each other along a longitudinal axis of the composite metal seal ring.

BRIEF DESCRIPTION OF THE DRAWINGS

Other objects and advantages of the invention will become apparent upon reading the following detailed description with reference to the accompanying drawings wherein.

Figure 1:
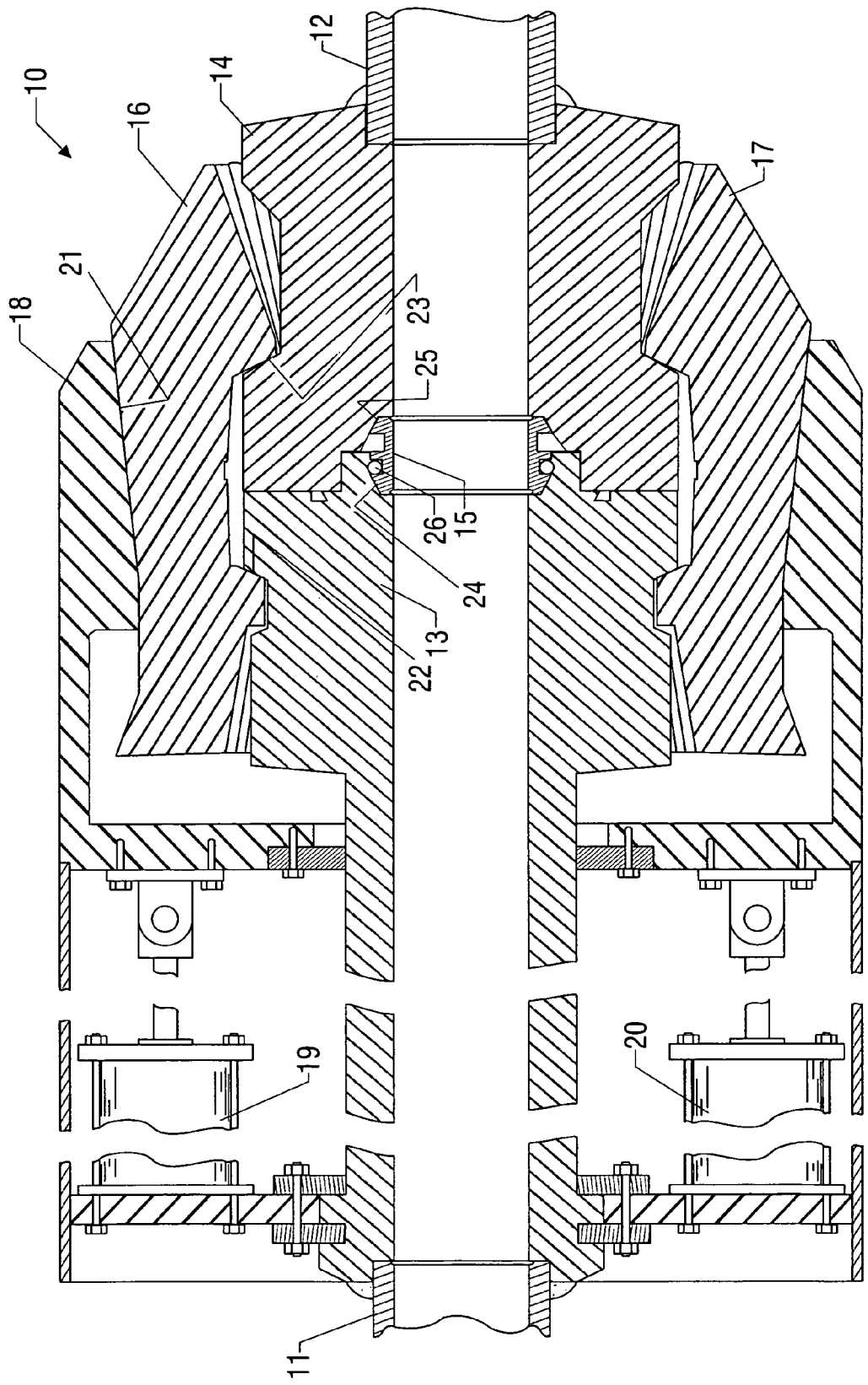
FIG. 1 is a longitudinal cross-sectional view of a collet-actuated pipe connector using the composite metal seal of the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

Turning now to FIG. 1 of the drawings, there is shown a longitudinal cross-sectional view of a collet-actuated pipe connector generally designated 10. The pipe connector 10 provides a releasable, fluid pressure-containing connection between a first pipe 11 and a second pipe 12. The connector 10 has a female hub 13 welded to an end portion of the first pipe 11, and a male hub 14 welded to an end portion of the second pipe 12. Each of the hubs 13, 14 has radial symmetry about a central longitudinal axis, and each of the hubs has a central bore about the longitudinal axis for passage of fluid (not shown) between the first pipe 11 and the second pipe 12.

In order to make a pressure seal between the pipes 11, 12, a composite metal seal ring 15 in accordance with the invention is wedged between the hubs 13, 14. The two hubs 13, 14 in turn are held together by a collet actuating mechanism having a multiplicity of rocking fingers 16, 17 and a collet ring 18. Hydraulic cylinders 19, 20 are mounted to the female hub 13 for moving the collet ring 18 in a longitudinal direction with respect to the female hub along the central, longitudinal axis of the pipes 11, 12 and the hubs 13, 14.

FIG. 1 shows the collet ring 18 in a closed position, in which the fingers 16, 17 are rocked into engagement with the male hub 14. The hydraulic cylinders 19 apply a substantially constant, longitudinal force upon the collet ring tending to force the collet ring to the right in FIG. 1. This longitudinal force acts upon a tapered inner surface 21 of the collet ring and mating inclined outer surfaces of the collet fingers 16, 17 to force the collet fingers 16, 17 radially inward upon the hubs 13, 14. Each collet finger 16, 17 has a pair of inclined inner surfaces which mate with tapered outer surfaces 22, 23 of the female hub 13 and the male hub 14, respectively. Therefore, the radial inward force applied by the collet fingers 16, 17 causes the male hub 14 to exert a longitudinal force upon the female hub 13. This longitudinal force of the male hub 14 upon the female hub 13 in turn wedges the composite metal seal ring 15 into engagement with inner tapered surfaces 24, 25 of the female hub 13 and the male hub 14, respectively.

The hydraulic cylinders 19, 20 can be actuated to move the collet ring 18 longitudinally leftward with respect to the female hub 13, causing the collet fingers 16, 17 to rock to open positions, permitting the male hub 14 to be moved longitudinally rightward with respect to the female hub 13 to disengage the male hub from the female hub. In this situation, an elastomeric or thermoplastic O-ring 26 helps retain the composite metal seal ring in engagement with the female hub 13 when the male hub 14 is disengaged from the female hub. The same male hub 14, or a different male hub on another pipe, can later be re-engaged with the female hub 13, and forced into a sealing relationship with the female hub by actuation of the hydraulic cylinders 19, to move the collet ring 18 leftward with respect to the female hub 13. In this fashion, the composite metal seal ring 15 can set and reset a pressure seal a plurality of times.

The collet actuating mechanism shown in FIG. 1 permits the remote assembly and disassembly of high-pressure subsea pipelines. Further details of a similar collet actuating mechanism are disclosed, for example, in Wittman et al. U.S. Pat. No. 4,477,105, incorporated herein by reference.

Figure 2:
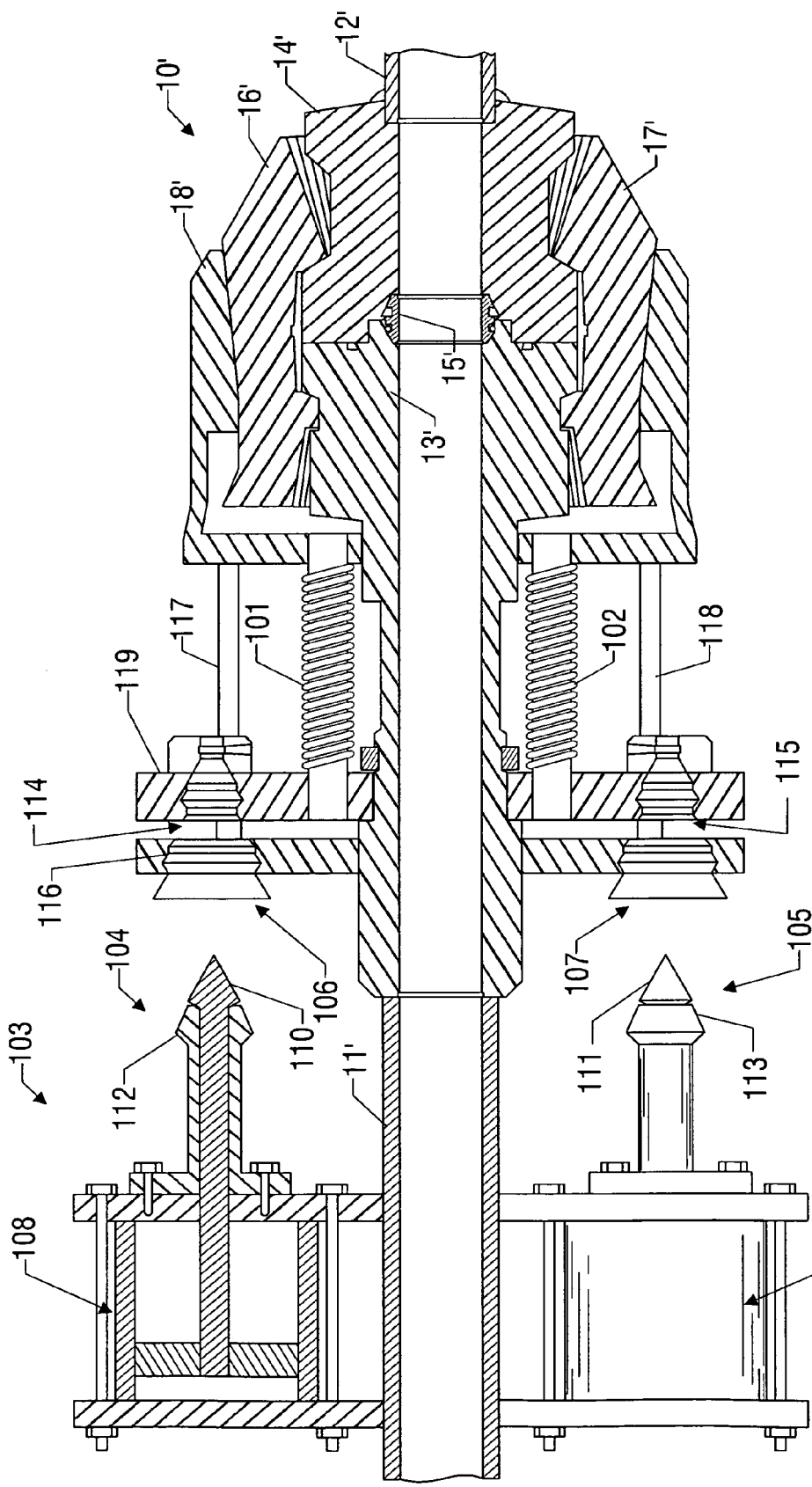
FIG. 2 is a longitudinal cross-sectional view of a modification to the collet-actuated pipe connector of FIG. 1 in which hydraulic cylinders are easily removable from the collet-actuated pipe connector.

FIG. 2 shows a modification to the collet actuating mechanism of FIG. 1 to permit the hydraulic cylinders to be removed after a pipeline connection has been made. Components in FIG. 2 that are similar to components in FIG. 1 are designated with similar but primed reference numerals. The modified collet actuating mechanism 10' in FIG. 2 includes helical compression springs 101, 102 that apply a longitudinal force to the collet ring 18' to keep the hubs 13', 14' in an engaged configuration.

To open the collet fingers 16', 17' for disengagement or reengagement of the hubs 13', 14', a removable running tool 103 is slipped vertically onto the pipe 11' to the position shown in FIG. 2. Then the running tool 103 is moved horizontally to the right in FIG. 2 so that hydraulic actuator shafts 104, 105 of the running tool engage respective sockets 106, 107 of the collet actuating mechanism 10'. Then hydraulic cylinders 108, 109 of the running tool are pressurized to cause hydraulic piston shafts 110, 111 to extend further outward from the hydraulic cylinders. This causes outer fingers 112, 113 of the hydraulic actuator shafts 104, 105 to expand radially outward from the piston shafts 110, 111 so that the fingers 112, 113 lock into the respective sockets 106, 107, and then the ends of the piston shafts press against respective sockets 114, 115 in the collet actuating mechanism 10'. The sockets 106, 107 are in a plate 116 connected via shafts 117, 118 to the collet ring 18', and the sockets 114, 115 are in a plate 119 secured to the female hub 13'. Therefore, further relative movement of the piston shafts 110, 111 outwardly from the hydraulic cylinders 108, 109 causes the body of the running tool 103 to move leftward in FIG. 2. This pulls the plate 116 leftward with respect to the female hub 13', and moves the collet ring 18' leftward with respect to the female hub 13'. This in turn compresses the compression springs 101, 102 and rocks the collet fingers 16', 17' toward their open positions.

Once the hubs 13', 14' are disengaged and reengaged, hydraulic pressure upon the pistons in the cylinders 108, 109 can be reversed to return the collet fingers 16', 17' to their closed positions. Then the running tool 103 can be removed horizontally leftward from the collet actuating mechanism 10', and removed vertically from the pipe 11'.

Figure 3:
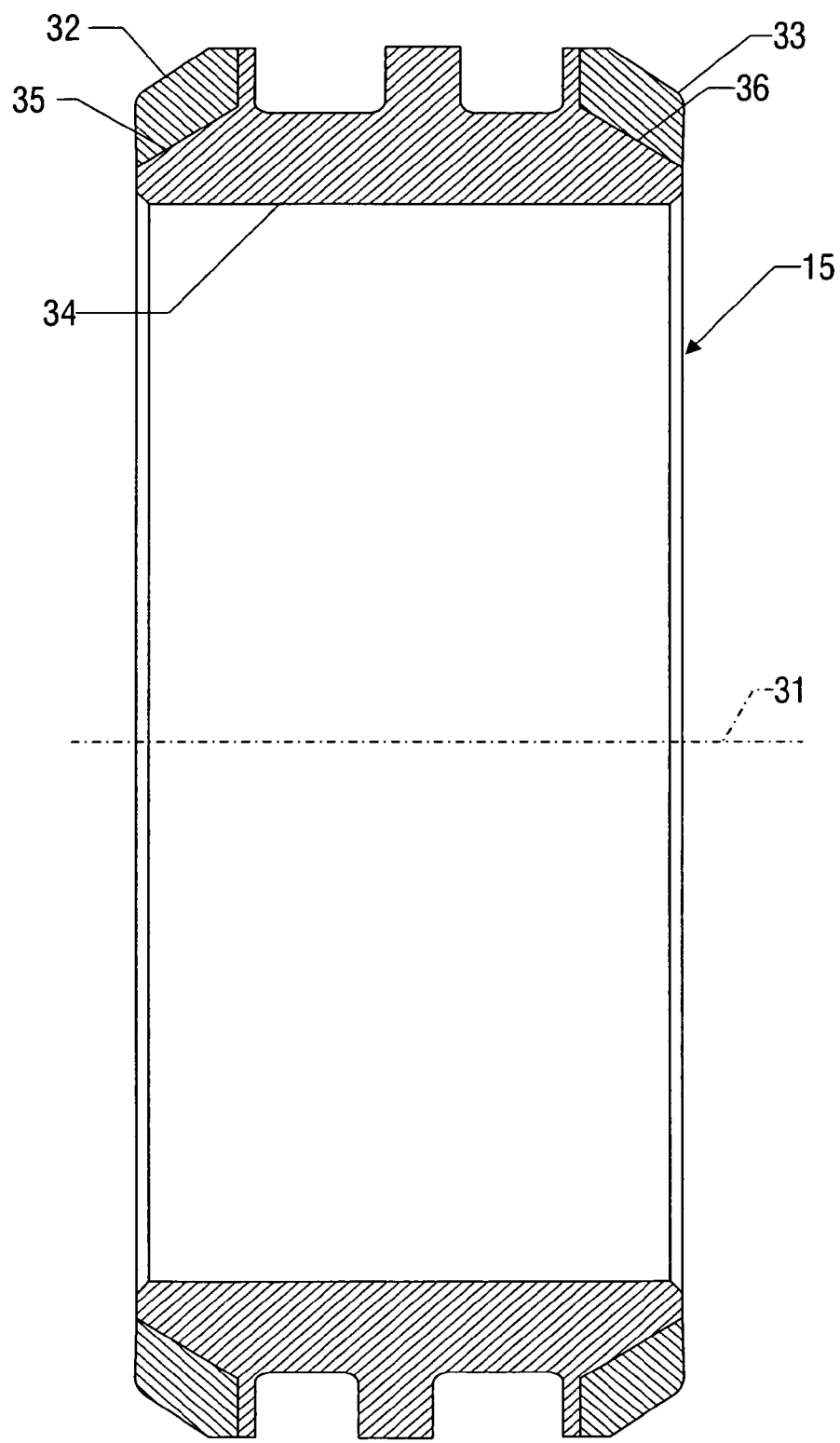
FIG. 3 is an enlarged cross-sectional view of the composite metal seal shown in FIG. 1.

FIG. 3 is an enlarged cross-sectional view of the composite metal seal ring 15 introduced in FIG. 1. The composite metal seal ring 15 is an annulus that is radially symmetric with respect to a longitudinal axis 31. For example, for sealing a pipe connection between 3 and 1/16 inch internal diameter pipe, the composite metal seal ring 15 has an inner diameter of 3.09 inches, an outer diameter of 3.941 inches, and a longitudinal width of 1.600 inches. A similar seal geometry can be used for sealing pipe connections between pipes having internal diameters from about 2 inches to at least 36 inches. For the larger diameter pipes, the radial dimension of the seal is of course increased in proportion to the pipe diameter, but the same radial thickness and longitudinal dimension can be used for the larger pipe diameters.

The composite metal seal ring 15 is pressure energized, and it is operative via compression between two respective angular surfaces 32, 33 at opposite longitudinal end portions of the seal ring. Therefore, the seal ring 15 is a hybrid of seal type AX (pressure energized) and type BX (compression seal between two angular surfaces at each end). The seal ring 15 is designed for containing a pressure up to 10,000 psi, although it could be designed for higher pressures, for example, 15,000 psi, 20,000 psi, or more.

In accordance with the invention, the composite metal seal ring 15 has a relatively hard metal core 34 and at least one annular region of relatively soft metal. For the ring in FIG. 3, there are two such annular regions 35, 36. The relatively hard metal core is inlaid and overlaid with relatively soft metal 35, 36. The relatively soft metal overlays 35, 36 provide respective parallel-spaced annular sealing surfaces 32, 33, which are tapered in opposite directions. The soft overlay metal can flow into any discontinuity that may exist in the hub seal surfaces and effect a seal. Moreover, the soft overlay metal will not scratch or impinge the hub sealing surfaces.

The hard metal core 34 ensures that there can be a relatively high contact stress between the metal seal ring 15 and the hub sealing surfaces. The high compressive stress in the seal enhances the seal's ability to withstand any external pressure, and internal pressure further energizes the seal. By overlaying a high strength core, the high strength capacity of the seal is maintained and a softer exterior surface is presented that will deform prior to deformation of the hub surfaces. Therefore, the hard metal core 34 ensures that the seal ring can be used after making and breaking the metal seal numerous times.

As shown in FIG. 3, the soft metal overlays 35, 36 are configured and dimensioned to cause a concentration of stress at the seal ring and hub interfaces for controlled deformation of the soft metal overlay into the hub surfaces. The thickness of the soft metal overlays 35, 36 in the radial direction is on the order of the thickness of the hard metal core 34 in the radial direction. In particular, the thickness of the soft metal overlays 35, 36 in the radial direction is at least one-eighth of an inch.

The radial interference of the composite metal seal 15 in an assembly with two mating hubs (13, 14 in FIG. 1) is preferably about 0.005 inches more than the radial interference of a standard metal seal made of the relatively hard material. For example, for a standard metal seal having a size similar to the composite metal seal 15 in FIG. 3, the standard metal seal typically would have a radial interference of about 0.005 inches with the mated hubs. An additional radial interference of 0.005 inches ensures that the contact pressure applied between the hubs and the relatively soft metal overlay of the seal will reach the elastic stress limit of the material of the relatively soft metal overlay and cause some plastic deformation and flow of the soft metal overlay. For example, the additional radial interference of 0.005 inches would cause a desired degree of plastic deformation for materials having elastic stress limits of about 20,000 to about 80,000 psi. This control of the thickness and geometry of the overlay material ensures that the seal material is able to flow into defects that might exist in the hub surfaces and would otherwise prevent the formation of a proper metal-to-metal seal.

Figure 4:
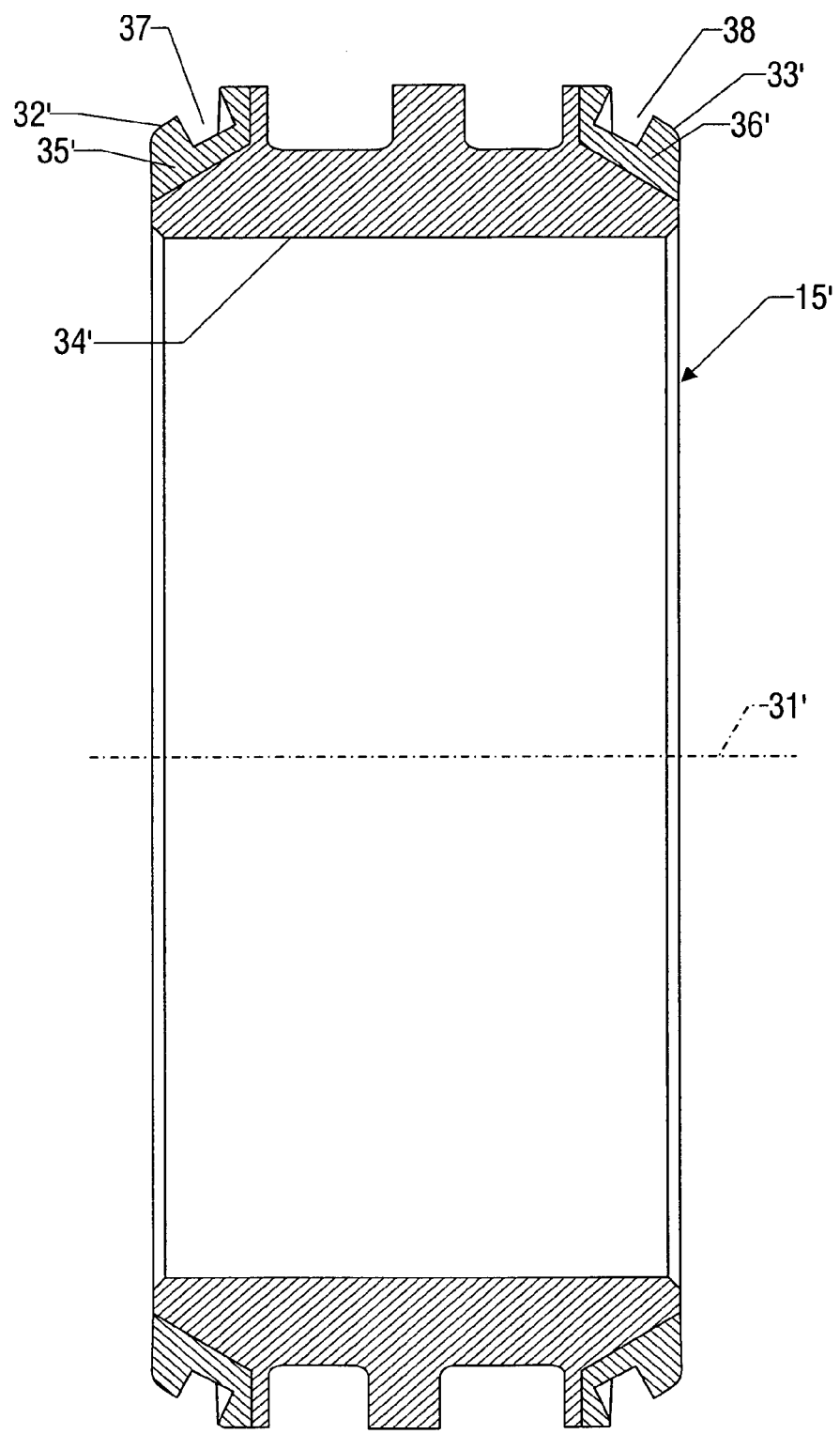
FIG. 4 shows a modification to the composite metal seal of FIG. 3 to permit elastomeric O-rings to be used with the seal for sealing hub surfaces which have been slightly damaged.

Shown in FIG. 4 is a composite metal seal 15' that is a modification of the composite metal seal 15 of FIG. 3. Features in FIG. 4 that are similar to features in FIG. 3 are designated with similar but primed reference numerals. In the seal 15' of FIG. 4, the soft metal overlays 35', 36' are provided with rectangular grooves 37, 38 to hold respective elastomeric O-rings (not shown). Each respective rectangular groove 37, 38 in each of the soft metal overlays 35', 36' has walls that are perpendicular to the tapered sealing surfaces of the soft metal overlay. Therefore, each rectangular groove 37, 38 has tapered walls, one of which is an undercut in the radial direction with respect to the longitudinal axis 31'. By using respective elastomeric O-rings (not shown) in the grooves 37, 38, it is possible to make a pressure seal between hubs that have sealing surfaces damaged to such a degree that the composite metal seal 15' in FIG. 3 cannot make a proper pressure seal. However, use of the seal 15' in FIG. 4 with elastomeric O-rings is not recommended when it is possible to make a proper pressure seal with the metal seal 15 of FIG. 3, because a proper metal-to-metal pressure seal is considered more reliable than a metal-to-elastomeric pressure seal. For subsea pipe connections, such a metal-to-elastomeric seal should be used as a temporary measure until a damaged hub can be replaced, or as a contingency measure with appropriate handling of any failure of the metal-to-elastomeric pressure seal.

A preferred method of fabricating the composite metal seal ring 15 includes a welding overlay process. This welding process deposits the relatively soft metal overlay 35, 36 onto the relatively hard metal core 34 in such a way as to produce an integral bond between them. In other words, the composite metal seal ring 15 functions as an integral piece of metal, although the properties of the metal are different in different regions of the composite metal seal ring. The welding process may also slightly change the properties and dimensions of the hard metal core. Therefore, at the time of the welding process, the relatively hard metal core is rough machined and has dimensions larger than its desired final dimensions. Any dimensional change in the hard metal core induced by the welding process is eliminated during a final machining step.

Figure 5:
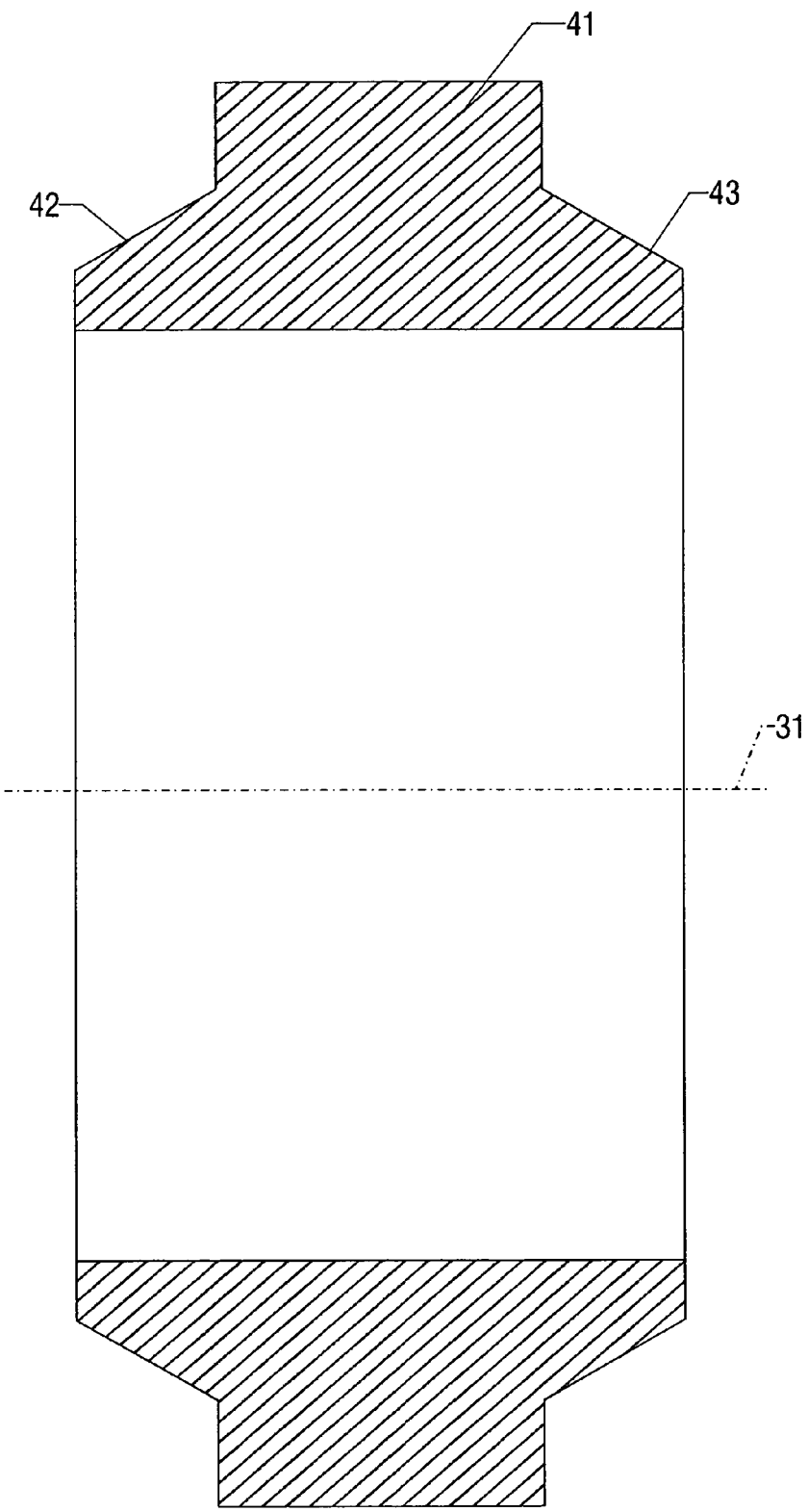
FIG. 5 is a cross-sectional view of the hard metal core of the seal of FIG. 3 after a rough machine operation during fabrication of the seal.

FIG. 5 is a cross-sectional view of the hard metal core of the seal of FIG. 3 after the initial rough machining operation. A hollow, cylindrical workpiece of high yield strength 17-4PH Stainless Steel is turned on a lathe to obtain the rough machined core 41 shown in FIG. 5. For the example of the 3 and 1/16 inch seal given above, this rough machined core 41 has an internal diameter 2.840 inches, an external diameter of 4.250 inches, and a longitudinal dimension of 1.842 inches. In addition, each of the longitudinal end portions of the core 41 are machined with a 30 degree taper 42, 43 beginning at a radius of 3.133 inches and extending 0.433 inches inward in the longitudinal direction.

Figure 6:
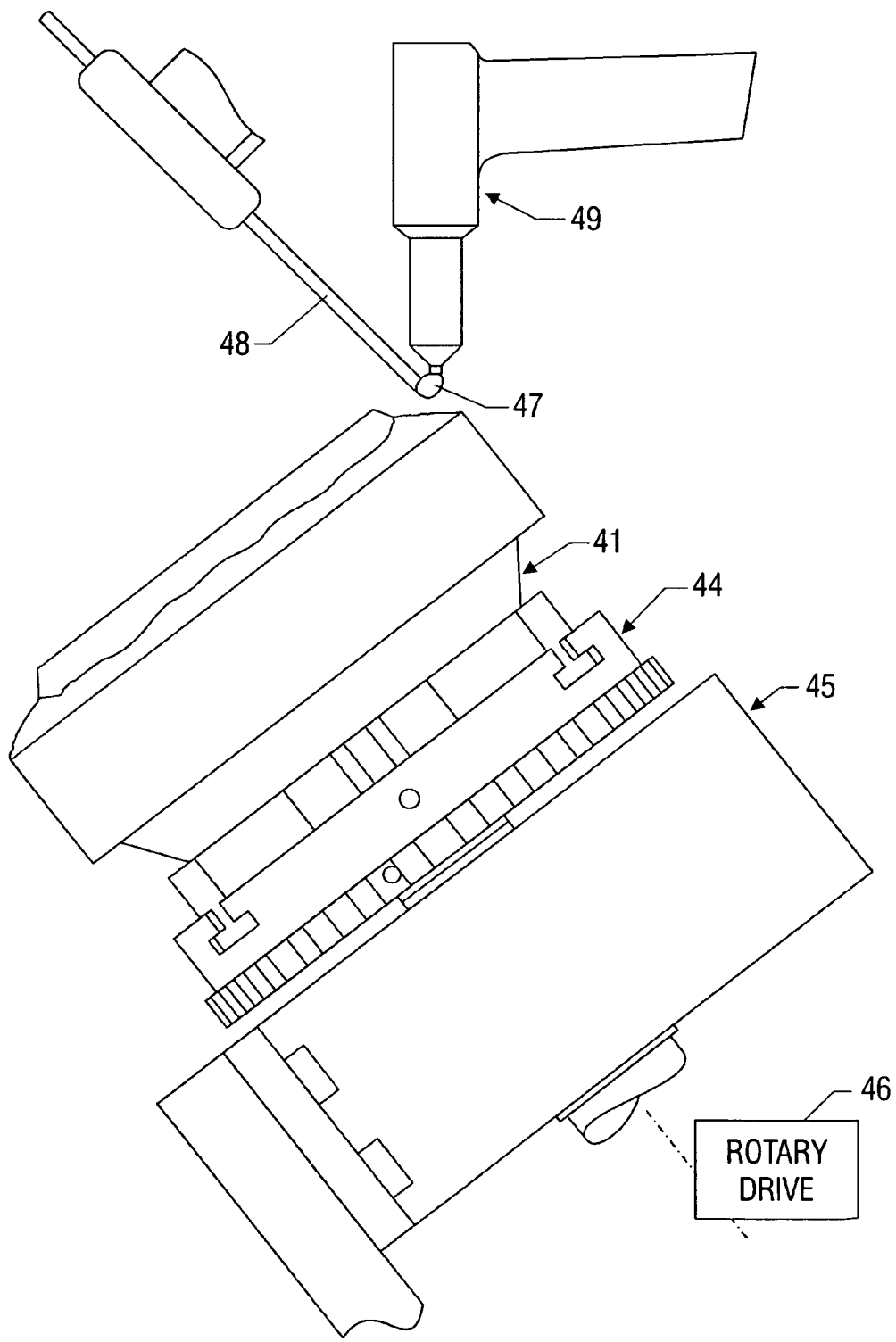
FIG. 6 is a pictorial diagram showing a gas-tungsten-arc-welding (GTAW) process for depositing the overlay of relatively soft metal over the hard metal core of the seal.

The welding overlay process is shown in FIG. 6. The rough machined core 41 is secured in a three-jaw chuck 44 mounted to the headstock 45 of a lathe or pipe welding machine, and slowly and automatically turned by a rotary drive 46. A number of layers of relatively soft, relatively ductile, and corrosion resistant type 316 Stainless Steel are deposited onto one end portion of the rough machined core from a metal arc 47 between a type 316 Stainless Steel welding rod 48 and a gas-tungsten-arc welding unit 59. After depositing the soft metal on one end of the core 41, the core is flipped over and again secured to the three-jaw chuck 44 to deposit the soft metal overlay on the other end of the core, resulting in the integral, composite metal structure 50 shown in FIG. 8.

Figure 7:
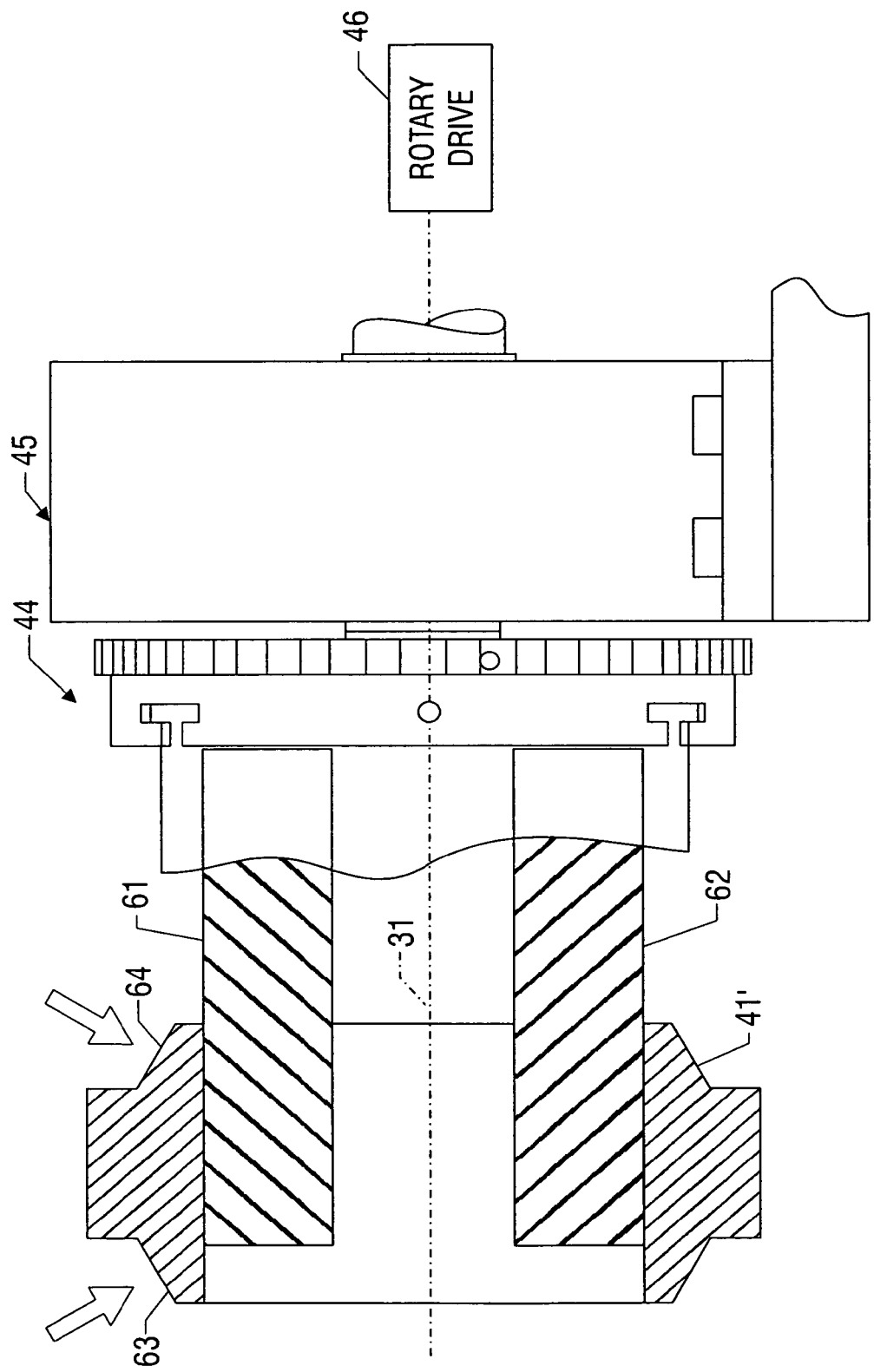
FIG. 7 is an elevation view, in partial section, showing an alternative configuration using elongated inner jaws of a chuck to permit the deposition of two annular regions of the weld overlay upon the hard metal core of the seal without releasing the chuck after the deposition of just one of the annular regions.

To eliminate the need for flipping the core over and again securing it to the three jaw chuck in the middle of the welding operation, it is possible to use extended inner jaws 61, 62 in the chuck 44, as shown in FIG. 7. In this case, a hard metal core 41' can be welded from the top at both ends, at the locations 63, 64 from the directions indicated by the large arrows.

Figure 8:
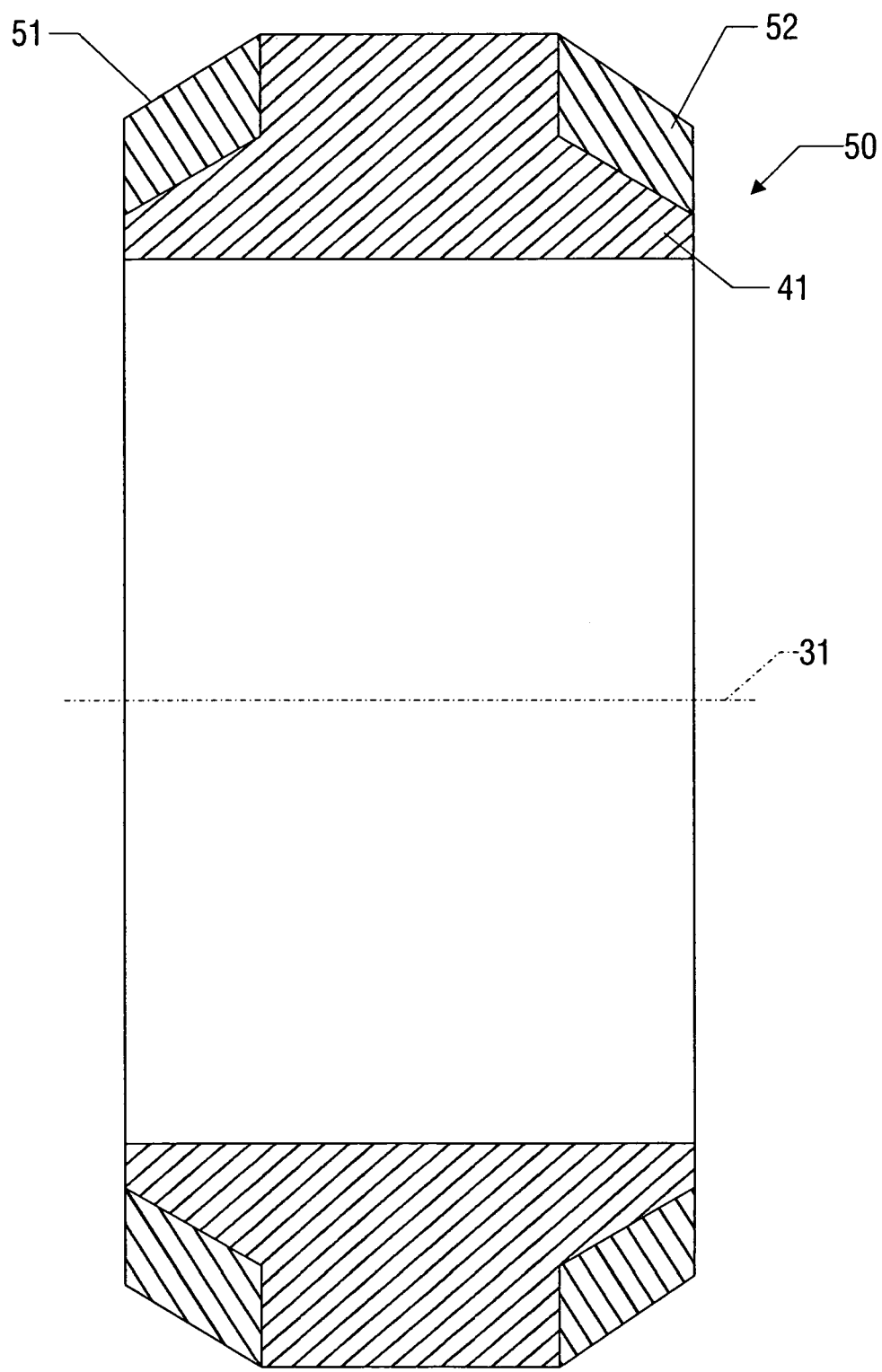
FIG. 8 is a cross-sectional view showing the overlay of relatively soft metal over the hard metal core prior to final machining of the composite metal seal.

As shown in FIG. 8, the composite structure 50 produced by the welding operation has two rings 51, 52 of the relatively soft metal overlay material welded to the relatively hard metal core 41. The composite structure is then turned on a lathe in a final machining operation to produce the composite metal seal ring 15 of FIG. 3 or the composite metal seal ring 15' shown in FIG. 4.

Although the composite metal seal ring is particularly useful in a remotely-actuated collet pipe connector, it can also be used in a pipe connector in which a pair of hubs mating with the seal ring are held together by bolts and clamping rings. Details of suitable clamping rings, for example, are shown in U.S. Pat. No. 4,725,080, incorporated herein by reference.

What is claimed is:

1. A composite metal seal comprising a core of relatively hard metal, and at least one annular region of relatively soft metal that is integrally bonded with the core of relatively hard metal and that provides an annular sealing surface for effecting a fluid pressure seal, wherein the annular region of relatively soft metal is welded onto the core of relatively hard metal.

2. The composite metal seal as claimed in claim 1, wherein the core of relatively hard metal is inlaid and overlaid with the relatively soft metal of the annular region of relatively soft metal.

3. The composite metal seal as claimed in claim 1, wherein the annular region of relatively soft metal has at least one annular groove in the neighborhood of the annular surface of the annular region of relatively soft metal.

4. The composite metal seal as claimed in claim 1, wherein the composite metal seal has a longitudinal axis, and the sealing surface is tapered with respect to the longitudinal axis.

5. The composite metal seal as claimed in claim 4, wherein the annular region of relatively soft metal has at least one annular groove in the neighborhood of the annular sealing surface, the annular groove being rectangular in cross-section and having walls that are perpendicular to the tapered annular sealing surface.

6. A composite metal seal ring for effecting a fluid pressure seal with respective annular surfaces of first and second hub members, the composite metal seal ring comprising an annular core of relatively hard metal, a first annular region of relatively soft metal integrally bonded to the annular core of relatively hard metal, and a second annular region of relatively soft metal integrally bonded to the annular core of relatively hard metal, the first annular region of relatively soft metal having a first annular surface for mating with the annular surface of the first hub member to effect a fluid pressure seal with the first hub member, and the second annular region of relatively soft metal having a second annular surface for mating with the annular surface of the second hub member to effect a fluid pressure seal with the second hub member, wherein the two annular regions of relatively soft metal are displaced from each other along a longitudinal axis of the composite metal seal ring, wherein the first annual annular region of relatively soft metal is welded onto the annular core of relatively hard metal, and the relatively soft metal of the second annular region of relatively soft metal is welded onto the annular core of relatively hard metal.

7. The composite metal seal ring as claimed in claim 6, wherein the annular core of relatively hard metal is inlaid and overlaid with the relatively soft metal of the first annular region of relatively soft metal, and the annular core of relatively hard metal is inlaid and overlaid with the relatively soft metal of the second annular region of relatively soft metal.

8. The composite metal seal ring as claimed in claim 6, wherein the first annular region of relatively soft metal has at least one annular groove in the neighborhood of the annular surface of the first annular region of relatively soft metal, and the second annular region of relatively soft metal has at least one annular groove in the neighborhood of the annular surface of the second annular region of relatively soft metal.

9. The composite metal seal ring as claimed in claim 6, wherein the composite metal seal ring has a longitudinal axis, and the annular surface of the first annular region of relatively soft metal is tapered with respect to the longitudinal axis to have a varying radius that is smallest away from the second annular region of relatively soft metal and that is largest toward the second annular region of relatively soft metal, and the annular surface of the second annular region of relatively soft metal is tapered with respect to the longitudinal axis to have a varying radius that is smallest away from the first annular region of relatively soft metal and that is largest toward the first annular region of relatively soft metal.

10. The composite metal seal ring as claimed in claim 9, wherein the first annular region of relatively soft metal has at least one annular groove in the neighborhood of the annular surface of the first annular region of relatively soft metal, the annular groove in the first annular region of relatively soft metal being rectangular in cross-section and having walls that are perpendicular to the tapered annular surface of the first annular region of relatively soft metal, and wherein the second annular region of relatively soft metal has at least one annular groove in the neighborhood of the annular surface of the second annular region of relatively soft metal, the annular groove in the second annular region of relatively soft metal being rectangular in cross-section and having walls that are perpendicular to the tapered annular surface of the second annular region of relatively soft metal.

11. A composite metal seal ring for effecting a resettable fluid pressure seal with respective annular surfaces of first and second hub members, the composite metal seal ring comprising an annular core of relatively hard metal, a first annular region of relatively soft metal integrally bonded to the annular core of relatively hard metal, and a second annular region of relatively soft metal integrally bonded to the annular core of relatively hard metal, the first annular region of relatively soft metal having a first annular surface for mating with the annular surface of the first hub member to effect a fluid pressure seal with the first hub member, and the second annular region of relatively soft metal having a second annular surface for mating with the annular surface of the second hub member to effect a fluid pressure seal with the second hub member, wherein the two annular regions of relatively soft metal are displaced from each other along a longitudinal axis of the composite metal seal ring;

wherein the first annular region of relatively soft metal has a thickness in said radial direction of at least one-eighth of an inch, and the second annular region of relatively soft metal has a thickness in said radial direction of at least one-eighth of an inch;

wherein the annular core of relatively hard metal is inlaid and overlaid with the relatively soft metal of the first annular region of relatively soft metal, and the annular core of relatively hard metal is inlaid and overlaid with the relatively soft metal of the second annular region of relatively soft metal;

wherein the first annular region of relatively soft metal is welded onto the annular core of relatively hard metal, and the relatively soft metal of the second annular region of relatively soft metal is welded onto the annular core of relatively hard metal;

wherein the composite metal seal ring has a longitudinal axis, and the annular surface of the first annular region of relatively soft metal is tapered with respect to the longitudinal axis to have a varying radius that is smallest away from the second annular region of relatively soft metal and that is largest toward the second annular region of relatively soft metal, and the annular surface of the second annular region of relatively soft metal is tapered with respect to the longitudinal axis to have a varying radius that is smallest away from the first annular region of relatively soft metal and that is largest toward the first annular region of relatively soft metal.

12. The composite metal seal ring as claimed in claim 11, wherein the first annular region of relatively soft metal has at least one annular groove in the neighborhood of the annular surface of the first annular region of relatively soft metal, the annular groove in the first annular region of relatively soft metal being rectangular in cross-section and having walls that are perpendicular to the tapered annular surface of the first annular region of relatively soft metal, and wherein the second annular region of relatively soft metal has at least one annular groove in the neighborhood of the annular surface of the second annular region of relatively soft metal, the annular groove in the second annular region of relatively soft metal being rectangular in cross-section and having walls that are perpendicular to the tapered annular surface of the second annular region of relatively soft metal.

13. The composite metal seal ring as claimed in claim 11, wherein the composite metal seal ring is adapted for containing a pressure within the hubs of at least 10,000 psi.

14. The composite metal seal ring as claimed in claim 11, wherein the composite metal seal ring has an internal diameter of at least 3 inches.

15. The composite metal seal ring as claimed in claim 11, wherein the composite metal seal ring is a hybrid of a pressure energized seal type AX and a compression seal type BX.

16. A composite metal seal ring for effecting a resettable fluid pressure seal with respective annular surfaces of first and second hub members, the composite metal seal ring comprising an annular core of relatively hard metal, a first annular region of relatively soft metal integrally bonded to the annular core of relatively hard metal, and a second annular region of relatively soft metal integrally bonded to the annular core of relatively hard metal, the first annular region of relatively soft metal having a first annular surface for mating with the annular surface of the first hub member to effect a fluid pressure seal with the first hub member, and the second annular region of relatively soft metal having a second annular surface for mating with the annular surface of the second hub member to effect a fluid pressure seal with the second hub member, wherein the two annular regions of relatively soft metal are displaced from each other along a longitudinal axis of the composite metal seal ring;

wherein the first annular region of relatively soft metal has a thickness in said radial direction of at least one-eighth of an inch, and the second annular region of relatively soft metal has a thickness in said radial direction of at least one-eighth of an inch;

wherein the annular core of relatively hard metal is inlaid and overlaid with the relatively soft metal of the first annular region of relatively soft metal, and the annular core of relatively hard metal is inlaid and overlaid with the relatively soft metal of the second annular region of relatively soft metal;

wherein the first annular region of relatively soft metal is welded onto the annular core of relatively hard metal, and the relatively soft metal of the second annular region of relatively soft metal is welded onto the annular core of relatively hard metal;

wherein the composite metal seal ring has a longitudinal axis, and the annular surface of the first annular region of relatively soft metal is tapered with respect to the longitudinal axis to have a varying radius that is smallest away from the second annular region of relatively soft metal and that is largest toward the second annular region of relatively soft metal, and the annular surface of the second annular region of relatively soft metal is tapered with respect to the longitudinal axis to have a varying radius that is smallest away from the first annular region of relatively soft metal and that is largest toward the first annular region of relatively soft metal; and wherein the composite metal seal ring is adapted for containing a pressure within the hubs of at least 10,000 psi, the composite metal seal ring has an internal diameter of at least 3 inches, and the composite metal seal ring is a hybrid of a pressure energized seal type AX and a compression seal type BX.

\* \* \* \* \*

UNITED STATES PATENT AND TRADEMARK OFFICE
CERTIFICATE OF CORRECTION

| | |
|---|---|
| PATENT NO. | : 7,467,799 B1 |
| APPLICATION NO. | : 09/369134 |
| DATED | : December 23, 2008 |
| INVENTOR(S) | : Oran D. Tarlton |

It is certified that error appears in the above-identified patent and that said Letters Patent is hereby corrected as shown below:

In claim 6, col. 7, line 28, before "annular", "annual" is canceled.

Signed and Sealed this

Tenth Day of February, 2009

JOHN DOLL
*Acting Director of the United States Patent and Trademark Office*